No. 661,815.  
H. PREUSS.  
DRIVING APPARATUS FOR VEHICLES.  
(Application filed May 26, 1900.)  
Patented Nov. 13, 1900.

(No Model.)

Witnesses:  
James R. Mansfield  
W. Cleary Sullivan

Inventor:  
Henry Preuss  
By Alexander Boswell  
Attorneys.

UNITED STATES PATENT OFFICE.

HENRY PREUSS, OF HAMBURG, GERMANY.

DRIVING APPARATUS FOR VEHICLES.

SPECIFICATION forming part of Letters Patent No. 661,815, dated November 13, 1900.

Application filed May 26, 1900. Serial No. 18,095. (No model.)

*To all whom it may concern:*

Be it known that I, HENRY PREUSS, a citizen of Hamburg-Hohenfelde, residing at Hamburg-Hohenfelde, in the Empire of Germany, have invented certain new and useful Improvements in Driving Apparatus for Vehicles or other Apparatus, (for which I have applied for patents in England, No. 7,269, dated April 19, 1900; in France, No. 287,643, dated April 19, 1900; in Belgium, No. 117,952, dated April 19, 1900, and in Germany, dated April 11, 1900,) of which the following is a specification.

This invention is an improvement in bicycles or other foot-propelled vehicles, and has particular reference to the construction of the propelling apparatus; and it consists in the novel construction and combination of parts hereinafter described and claimed, and illustrated in the accompanying drawings, in which—

Figure 1:
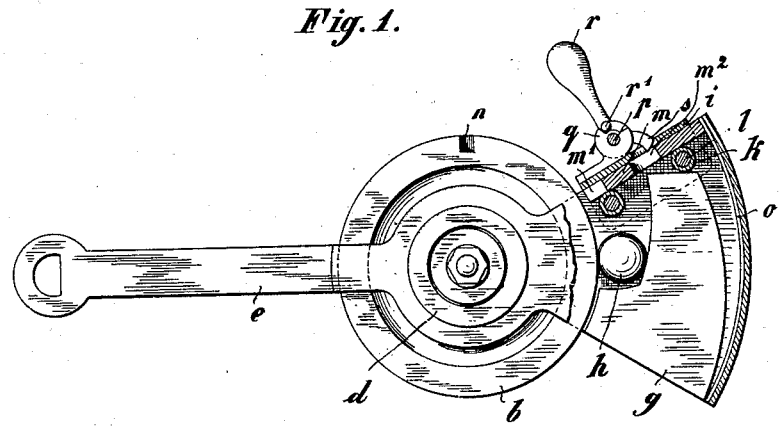
Figure 2:
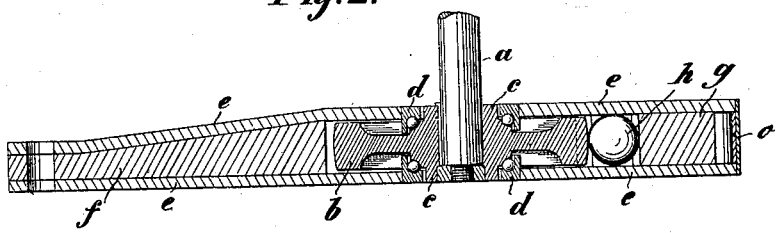
Figure 3:
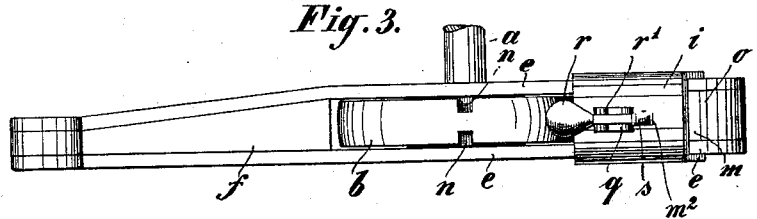

Figure 1 is a side view, partly in section, of the pedal apparatus of a bicycle or like vehicle. Fig. 2 is a longitudinal section through Fig. 1. Fig. 3 is a top plan view.

Referring to the drawings, $a$ designates the axle or crank-shaft of a bicycle or other vehicle to be propelled by foot-power. Upon the end of this axle (one only being shown) are fixed disks $b$, which are provided with enlarged hubs $c$, which are provided with ball-races, over which are fitted the rings $d$, attached to the crank $e$. This crank has a forward extension to which the pedal may be attached, and also has a rearward extension provided with a weight $g$ sufficient to overbalance the pedal and normally swing the same upward when the crank is not locked to the disk $b$. Interposed between the top of the weight $g$ and the plate $i$ is a slide $m$, which rests upon rollers $k$ on through-bolts $l$, which connect the opposite plates of the crank. This slide is normally thrown forward into engagement with notches $n$ on the disk $b$ by means of a flat spring $o$, as shown; but it may be thrown and held out of engagement with the disk by means of the finger $s$ on the lever $r$, which is pivoted between ears $q$ on plate $i$ and is provided with stop-pins $r'$ to limit its movement.

The weight $g$ has a cam-shaped recess on its inner side adjoining the periphery of the disk $b$, and in this recess is placed a ball $h$, which when the pedal is pressed downward will bind between the periphery of the disk and the weight $g$, and thus lock the crank to the disk. When the pedal is released, the weight will throw the pedal upward and the ball will be disengaged from the disk without stopping the rotation of the latter. This ball is simply a form of automatic clutch device for locking the crank to the disk automatically and only comes into play when the slide $m$ is disengaged from the disk, as indicated in Fig. 1.

If it is desired to lock the crank to the disk, lever $r$ is turned down and permits spring $o$ to force slide $m$ into engagement with the notches $n$ and lock the crank to the disk permanently. When locked to the disk the pedal will be rotated as in the ordinary bicycle.

In climbing a hill, where more power may be required, the slide $m$ is disengaged from the disk $b$, and then the pedal is simply vibrated up and down through a short arc, so as to continuously and rapidly propel the disk $b$ by means of clutch $h$, and thus much of the lost motion of the crank is avoided and the shaft can be propelled with great power and more or less rapidity, according to the strokes or reciprocations of the crank.

Having thus described my invention, what I claim as new, and desire to secure by Letters Patent, is—

1. The combination of the shaft, the crank pivotally mounted thereon, said crank being overweighted at one end, a clutch on the weighted end of the crank for automatically locking it to the crank-shaft, and means for locking the crank permanently to the crank-shaft if desired, for the purpose and substantially as specified.

2. The combination of the crank-shaft, the disk thereon, the crank pivoted on said shaft beside the disk, an overbalancing weight on one end, and a clutch on the weighted end of the crank adapted to engage said disk, and means for locking the crank to the disk, substantially as described.

3. The combination of the crank-shaft, the disk thereon, the crank pivotally mounted on said shaft and an overbalanced weight at one end, a slide on said weighted end adapted to lock the crank to said disk permanently, means for operating said slide, and a clutch on said weighted end adapted to lock the crank to the disk when the pedal is depressed and the slide disengaged from the disk, all substantially as and for the purpose described.

In testimony whereof I have hereunto set my hand in the presence of two witnesses.

HENRY PREUSS.

Witnesses:
 LEO TOLLES,
 E. H. L. MUMMENHOFF.